United States Patent [19]
Lewis et al.

[11] Patent Number: 5,618,499
[45] Date of Patent: Apr. 8, 1997

[54] CATALYST OUTAGE PROTECTION SYSTEM

[75] Inventors: Edward C. Lewis, Wadsworth; Donald P. Tonn, Copley; Michael G. Varner, Canton, all of Ohio

[73] Assignee: The Babcock & Wilcox Company, New Orleans, La.

[21] Appl. No.: 375,884

[22] Filed: Jan. 20, 1995

[51] Int. Cl.⁶ .............................. B01J 8/00; C01B 21/02
[52] U.S. Cl. ................ 422/177; 422/211; 423/239.1; 110/264; 110/347
[58] Field of Search ....................... 422/172, 173, 422/177, 211, 176; 423/239.1; 110/347, 264

[56] References Cited

U.S. PATENT DOCUMENTS

| | | | |
|---|---|---|---|
| 4,713,152 | 12/1987 | Walsh | 204/130 |
| 5,045,516 | 9/1991 | Vogel et al. | 502/309 |
| 5,380,499 | 1/1995 | MacInnis | 422/173 |
| 5,423,272 | 6/1995 | Dunn, Jr. et al. | 110/347 |
| 5,437,851 | 8/1995 | MacInnis | 423/239.1 |

*Primary Examiner*—Nina Bhat
*Attorney, Agent, or Firm*—Daniel S. Kalka; Robert J. Edwards

[57] ABSTRACT

An outage protection system for a SCR (selective catalytic reduction) reactor utilizes a pair of dampers to isolate the catalyst bed and the ammonia injection grid of the SCR reactor and to provide a blower driven closed loop flow of externally heated air from the injector grid across the catalyst bed to an external heater and back to the injection grid.

6 Claims, 1 Drawing Sheet

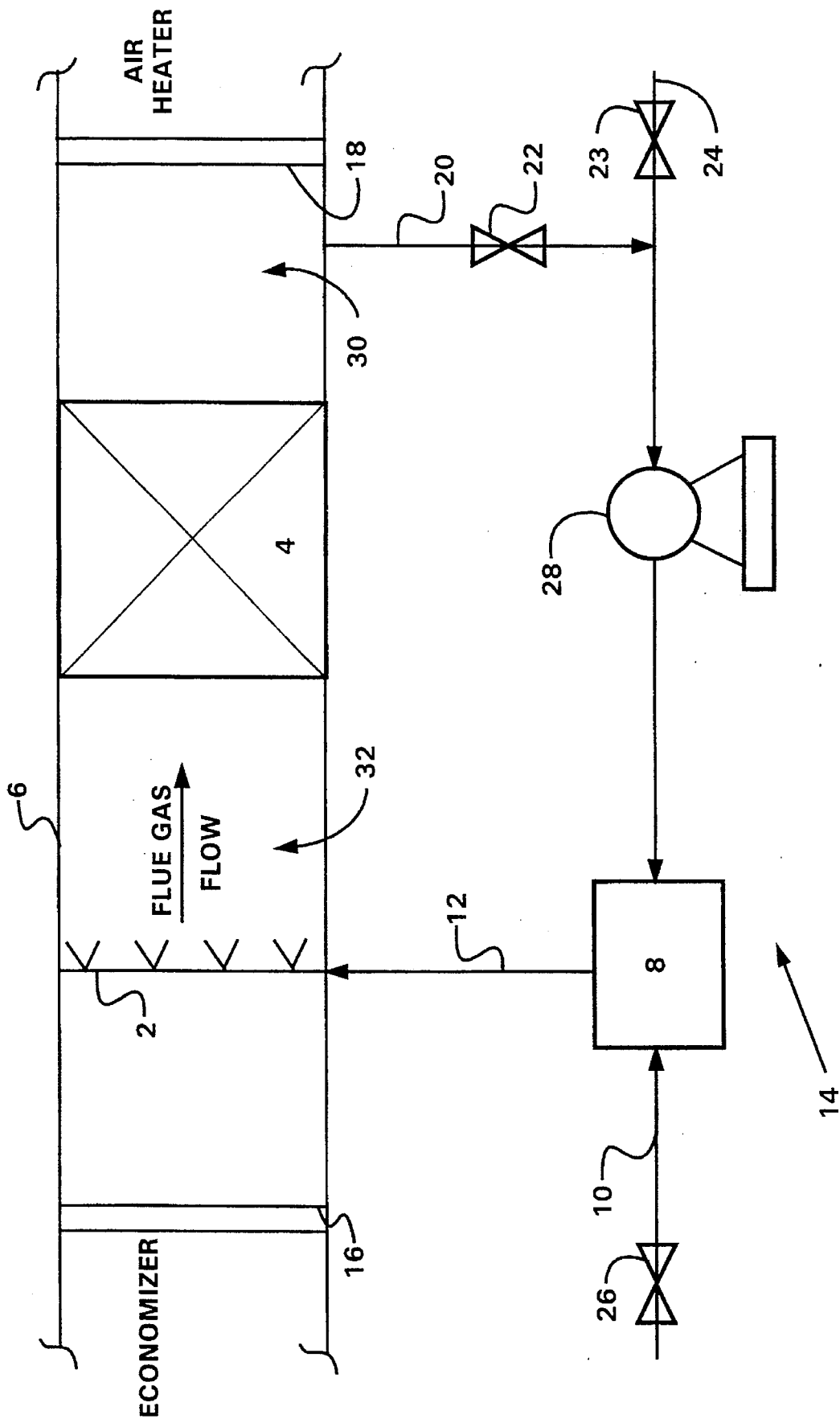

CATALYST OUTAGE PROTECTION SYSTEM

BACKGROUND OF INVENTION

1. Field of the Invention

The present invention relates to SCR (Selective Catalytic Reduction) systems in general and in particular to catalyst protection assemblies for such systems.

2. Description of the Related Art

Selective catalytic reduction systems catalytically reduce flue gas $NO_x$ from combustion systems such as power generation boilers to $N_2$ and $H_2O$ using ammonia in a chemical reduction process. This technology is the most effective method of reducing $NO_x$ emissions especially where high reduction percentages (70–90%) or low stack emission levels are required. $NO_x$ emissions from boilers are typically 90 to 95% NO with the balance being $NO_2$. However, when the flue gas leaves the flue stack, the bulk of the NO is oxidized to $NO_2$ which reacts in the environment to result in acid rain as well as producing smog constituents.

In boilers using SCR systems, the catalyst is housed in a reactor which is strategically located within the flue gas system. This location permits catalyst exposure to proper SCR reaction temperatures. The reactor design includes a sealing system to prevent flue gas bypassing and an internal support for structural stability of the catalyst. The reactor configuration can be vertical or horizontal depending on the fuel used, space available and upstream and downstream equipment arrangement. Uniform flow distribution of ammonia is required for optimum performance.

Ammonia is introduced upstream of the SCR reactor either in the form of anhydrous ammonia or vaporized aqueous ammonia.

Anhydrous ammonia can be introduced into the flue gas stream using relatively little energy. The pressurized anhydrous ammonia is evaporated with either small electric source or with steam coils. The ammonia vapor is then diluted with air to provide the mass necessary to distribute the reagent evenly over the ductwork cross section. The diluted ammonia-air mixture is delivered to a grid of injection pipes located in the flue gas ductwork. The major disadvantage with using anhydrous ammonia is the safety concerns associated with the handling and storage of pressurized anhydrous ammonia. In fact, many local regulations often require aqueous ammonia to be used instead of anhydrous ammonia. This is especially true in highly populated areas.

Aqueous ammonia is typically purchased in industrial grade approximately 30% by weight ammonia and 70% by weight water. A dedicated heater, usually of the electric type, is used to heat the dilution air to a level adequate enough to vaporize the required water and ammonia. A vaporization chamber or static mixer is used as the medium in which the phase change occurs. Usually atomization air is required to assist the break up of aqueous ammonia into fine droplets as it enters the vaporization chamber. The ammonia vapor-water vapor-air mixture exits the vaporization chamber and is delivered to an injection grid where injection occurs through a grid of injection pipes located in the flue gas ductwork upstream of the SCR catalyst bed.

It is well known that catalyst reactivity of the catalyst bed is adversely affected by contact of the catalyst with water, even small quantities of water. Therefore, condensation of water vapor onto the SCR catalyst surface results in premature deterioration of the catalyst. The process of condensation occurs if the temperature within the SCR system drops below the dewpoint temperature, which occurs when the boiler is off-line especially during boiler outages, as well as from moisture from boiler tube washing, air heater washing, and boiler tube leaks.

Known attempts at preventing such adverse condensation included the placing of tarps constructed of canvas, plastic, or other material over the catalyst during such outages or washing conditions. This provided incomplete protection of the catalyst and required extensive maintenance to place and fasten the tarps onto the catalyst. Personnel safety risks were also associated with this method from having the personnel work in a confined space.

Other systems established a constant draft of air, using either the large forced or induced draft fans, through the catalyst during off line and wash conditions. This provided limited protection from water condensation due to the turbulent flow and carryover of fluid through the catalyst as well as the air being too cool to prevent condensation.

Still other systems used a burner or other heat producing source in the duct to continually provide warm flue gas/air to the catalyst during off line conditions. The major disadvantages of the system were the increased safety risk to plant personnel, extensive capital and operating costs associated with such a system, and the difficulty of having flue gas contaminants in the system during the outage since these contaminants cannot be removed when the system is shut down.

Yet another system reduced the moisture content of the air surrounding the catalyst by isolating the catalyst system and recirculating air through a dehumidifier, which condenses the moisture out of the air. The major disadvantage of this system involved the disposal of condensate and increased maintenance, operating, and capital expense.

In view of the foregoing it is seen that an efficient system for protecting the catalyst during boiler outages was needed which would be cost and operationally effective and not subject the catalyst bed to flue contaminants.

SUMMARY OF THE INVENTION

The present invention solves the problems associated with prior art SCR reactor catalyst protection systems as well as other problems by providing a system which continuously maintains the catalyst temperature above the dew point temperature of the surrounding ambient environment during reactor outage conditions, thus preventing condensation of water onto the catalyst. The catalyst outage protection assembly of the invention utilizes a sealing of the area around the catalyst and providing a closed loop to recycle heated warm air through the catalyst bed. By recirculating the air, the only heat that must be replenished is the heat dissipated and lost through leaks at access doors, dampers, or other sources.

In view of the foregoing it will be seen that one aspect of the present invention is to provide a catalyst protection assembly for SCR reactor systems which prevents moisture condensation on the catalyst bed during system outages.

Another aspect of the present invention is to provide a sealing of the catalyst bed and ammonia injection grid from the rest of the SCR system during system outages.

Yet another aspect of the present invention is to utilize the ammonia injection grid of an SCR reactor system to evenly exhaust heated air across the catalyst bed to prevent water condensation therein.

These and other aspects of the present invention will be more fully understood upon a consideration of the following description of the preferred embodiment in conjunction with the associated drawing.

BRIEF DESCRIPTION OF THE DRAWINGS

FIG. 1 is a schematic view of the catalyst outage protection assembly for SCR reactors according to the present invention.

DESCRIPTION OF THE PREFERRED EMBODIMENT

Referring now to FIG. 1 where the showing is intended to depict a preferred embodiment of the invention while not limiting the invention thereto, FIG. 1 shows an ammonia injection system 2 which may be aqueous or anhydrous for a selective catalyst reactor having a catalyst bed 4. The selective catalyst reactor is located in a hot flue gas duct 6 typically located between the air heater and the economizer of a boiler system or any hot flue gas system.

During normal reactor operation, ambient air is heated by a heat exchanger 8 which may be an electric air heater or any heat exchanger and is used to vaporize the required aqueous ammonia 10 from an ammonia source (not shown) and is fed along line 12 to provide a stream of vaporized ammonia ($NH_3$) to an ammonia injection grid 2. The system injects a controlled amount of ammonia ($NH_3$) 10 where it is mixed with the preheated air. The mixture of heated air to ammonia is controlled by known control systems to be at about a 20:1 volume ratio which mixture is supplied along line 12 into the flue 6 through the injection grid 2 which is of known design. The unit-specific designed grid 2 is designed for each reactor to provide an even distribution of ammonia throughout the flue gas of that reactor. $NO_x$ reduction reactions take place as the flue gas and ammonia passes through the catalyst bed 4. Before entering the catalyst 4, the ammonia was injected into and thoroughly mixed with the flue gas.

Regardless of the catalyst used, it is well known that catalyst reactivity is adversely affected by contact with water even small quantities of water. Therefore, condensation of water vapor onto the SCR catalyst bed 4 surface can result in premature deterioration of the catalyst. The process of condensation will occur if the temperature within the SCR system drops below the dew point temperature, which may occur when a boiler or system is off-line. To alleviate this problem a catalyst outage protection system 14 is used during boiler outages. The catalyst outage protection system 14 was specifically designed to prevent unnecessary deterioration of the SCR catalyst during boiler outages. The underlying principle of the system is to continuously maintain the catalyst temperature above the dew point temperature of the surrounding environment, thus preventing condensation of water onto the catalyst. The system 14 utilizes a closed loop to recycle warm air through the SCR system. By recirculating the air, the only heat that must be replenished is the heat dissipated through leaks at access doors, dampers, or other sources.

The system 14 includes an inlet shutoff damper 16 located upstream of the injection grid 2 and downstream of the economizer as well as an outlet shutoff damper 18 located downstream of the catalyst bed 4 and upstream of the air heater. These dampers 16, 18 are open during normal operation as discussed above and are closed during a reactor/boiler/system outage to isolate the catalyst bed when the outage system 14 is activated. Line 20 completes the system loop for recirculation of warm air during outage periods.

Activation of the outage protection system 14 occurs after gas flow/cool down air flow through the SCR system has been suspended and the system is in the outage mode. At this time dampers 16 and 18 are closed. Depending on the type of damper operator this closing can occur manually or from a control system with the use of activators (not shown) connected to the inlet and outlet dampers. The normally isolated line 20 is activated for air flow by opening an isolation valve 22 and line 24 which normally provides process air from the atmosphere or a process air source (not shown) becomes isolated from the system by closing the isolation valve 23. This of course can occur manually, or from a control system. The aqueous ammonia source 10 becomes isolated automatically by a control system (not shown) when flue gas flow through the SCR system drops below a minimum set point or when the temperature of this flue gas reaches a minimum set point. Valve 26 or the like stops the ammonia 10.

This closed loop system functions with air blower 28 drawing the air from SCR reactor outlet 30 through line 20 and then conveying the air to electric heater 8 for warming. The heated air is supplied to line 12 and on to the injection grid 2 at the SCR reactor inlet 32. The warm air passes over the catalyst bed 4 and keeps moisture from condensing. Controls and a thermostat on heater 8 maintain the recirculated air at a selected set point temperature which is typically above the dew point of the recirculated air stream. Electrically heated warm air is constantly recirculated through the electric heater 8 out the injection grid 2 over the catalyst bed 4 and back to the dilution blower 28 via line 20 forming an economical closed loop heating system due to the dampers 16 and 18 isolating the bed 4 and the grid 2 to the recirculating heated air. Since all the components of the outage system except for line 20 and valve 22 are necessary for normal operation, there is minimal additional capital or maintenance costs.

Prior to restart of the boiler or flue gas generating process, the operation of the outage protection system 14 is discontinued and the SCR system is readied for normal operation. Line 20 is taken out of service by closing the isolation valve 22 and line 24 is reopened to the atmosphere or process air source. Dampers 16 and 18 are opened and the SCR reactor is ready to accept flue gas. Normal SCR system interlocks must be met prior to the injection of ammonia 10 which include opening valve 26. The outage protection system has kept the catalyst free of condensation for the duration of the unit outage.

Certain additions and modifications have been deleted herein for the sake of conciseness and readability but are intended to be covered in the scope of the following claims.

We claim:

1. A catalyst protection system for a selective catalytic reduction reactor for protecting the catalyst during an outage, comprising:

a catalyst bed located in a selective catalytic reduction reactor;

a fluid injection grid located upstream of said catalyst bed;

a first inlet damper and a second outlet damper situated at each end of the selective catalytic reduction reactor for isolating said catalyst bed and said injection grid during an outage, said inlet damper being mounted in the flue upstream of said fluid injection grid and said outlet damper being mounted downstream of said catalyst bed; and means for recirculating heated air across said catalyst bed through said fluid injection grid during the outage for protecting the catalyst from contact with water.

2. A catalyst protection system as set forth in claim 1, wherein said inlet and outlet dampers are open during normal reactor operation to allow flue gases to flow normally therethrough.

3. A catalyst protection system as set forth in claim 2, further comprising actuators connected to said inlet and outlet dampers through linkages to close said dampers sealing the flue from normal flue gas flow therethrough in response to control signals to said actuators from system control station.

4. A catalyst protection system as set forth in claim 1, wherein said recirculation means includes an air blower having an inlet downstream of said catalyst bed and an exhaust connected to heating means for heating the exhaust air above the dew point of the air stream.

5. A catalyst protection system as set forth in claim 4, wherein said fluid injection grid is normally connected to an ammonia source and heated air system.

6. A catalyst protection system as set forth in claim 4, wherein said heating means includes a series of electrical resistance heaters for heating the exhaust air from said air blower.

* * * * *